US 6,920,486 B2

(12) United States Patent
Kiiskinen

(10) Patent No.: US 6,920,486 B2
(45) Date of Patent: Jul. 19, 2005

(54) METHOD AND APPARATUS FOR ENABLING SYNCHRONIZING DATA IN DIFFERENT DEVICES HAVING DIFFERENT CAPABILITIES AND UNMATCHED DATA FIELDS

(75) Inventor: Arto Kiiskinen, Espoo (FI)

(73) Assignee: Nokia Corporation, Espoo (FI)

( * ) Notice: Subject to any disclaimer, the term of this patent is extended or adjusted under 35 U.S.C. 154(b) by 359 days.

(21) Appl. No.: 10/153,170

(22) Filed: May 20, 2002

(65) Prior Publication Data

US 2003/0217181 A1 Nov. 20, 2003

(51) Int. Cl.[7] .................................. G06F 15/167
(52) U.S. Cl. ................ 709/214; 709/220; 709/224; 707/100
(58) Field of Search .................... 709/203, 232, 709/220–224, 214; 707/100

(56) References Cited

U.S. PATENT DOCUMENTS

| | | | |
|---|---|---|---|
| 5,136,707 A | | 8/1992 | Block et al. |
| 5,701,423 A | | 12/1997 | Crozier et al. |
| 6,169,988 B1 | | 1/2001 | Asakura |
| 6,308,201 B1 | * | 10/2001 | Pivowar et al. ............ 709/214 |
| 6,360,250 B1 | | 3/2002 | Anupam et al. |
| 6,671,757 B1 | * | 12/2003 | Multer et al. ............. 710/100 |
| 6,694,336 B1 | * | 2/2004 | Multer et al. ............. 707/201 |
| 2002/0029227 A1 | | 3/2002 | Multer et al. |
| 2003/0140050 A1 | * | 7/2003 | Li et al. .................... 707/100 |
| 2004/0093342 A1 | * | 5/2004 | Arbo et al. ................ 707/102 |

OTHER PUBLICATIONS

Wireless Application Protocol MMS Encapsulation Protocol, Version Jan. 5, 2002; published on the Internet, by the Wireless Application Protocol Forum, Ltd.

SyncML Meta–Information DTD, version 1.1, Feb. 15, 2002, published on the Internet, by Ericsson, IBM, et al.

Extensible Markup Language (XML) 1.0, W3C Recommendation, Feb. 10, 1998, published on the Internet by the World Wide Web Consortium (W3C).

SyncML Representation Protocol, version 1.1, Feb. 15, 2002, published on the Internet, by Ericsson, IBM, et al.

SyncML Device Management Protocol, version 1.1, Feb. 15, 2002, published on the Internet, by Ericsson, IBM, et al.

SyncML Sync Protocol, version 1.1, Feb. 15, 2002, published on the Internet, by Ericsson, IBM, et al.

* cited by examiner

Primary Examiner—Wen-Tai Lin

(57) ABSTRACT

A method and apparatus by which a user of two or more client devices (10 11) each hosting a data store (10c 11c) can have the data stores kept synchronized by a server (12) (in some cases operated as a synchronizing service) in a way acceptable to the user even though at least one of the two data stores (10c) includes a data component (such as a field of a record) that is not in the other data store (11c) (or for which a correspondence from the one data store (10c) to the other data store (11c) in respect to the data component has not yet been set, including possibly a null correspondence). Any such so-called problem field is monitored by a sync field scanner (12g) usually hosted by the server, which alerts the user that a data component is a problem field only when the user first provides a value for the data component. The invention provides that, if possible, the sync field scanner (12g) automatically suggests to the user how to accommodate the problem field that occurs in one data store (10c) but not in the data store (11c).

26 Claims, 3 Drawing Sheets

METHOD AND APPARATUS FOR ENABLING SYNCHRONIZING DATA IN DIFFERENT DEVICES HAVING DIFFERENT CAPABILITIES AND UNMATCHED DATA FIELDS

TECHNICAL FIELD

The present invention pertains to synchronizing data stores on different devices, including telecommunications and computing devices. More particularly, the present invention concerns synchronizing data stores on different devices having data stores that differ in respect to one or more data components.

BACKGROUND ART

Today it is possible for a businessperson to use an e-mail application and a calendar application (i.e. an application for keeping track of appointments) on a mobile phone or a palm (handheld) computer (or some other mobile terminal) using a data store on the mobile phone or palm computer, and have an assistant use the same applications on a desktop computer to keep track of e-mail sent and received by the assistant on behalf of the businessperson, and to keep track of appointments for the businessperson using a data store on the desktop computer. Thus, when changes are made to either of the data stores (the data store on the mobile device and the data store on the desktop computer), each including data items (also called here data units) for both the e-mail and the calendar application, the data stores need to be synchronized. In synchronizing respective data stores (i.e. synchronizing both the data items and the data structure or data organization of the two data stores) used by two applications running on different equipment, the usual method is to arrange that the contents of the two data stores are set to correspond to each other based on a protocol in which changes since a last synchronization are communicated, conflicts between changes made on both pieces of equipment are resolved (according to some policy), and changes are made to either the data items or their organization or both in one or both of the data stores.

A facility is being developed for synchronizing such data stores based on what is called SyncML (synchronization markup language), being developed under the so-called SyncML Initiative. (See http://www.syncml.org/ for information about SyncML, including standards and specifications for SyncML, and the SyncML Initiative, especially including the SyncML Representation Protocol and the SyncML Sync Protocol.) SyncML is an open industry standard for a common language for universal synchronization of remote data (i.e. data items stored in different equipment and so in different data stores) and personal information across multiple networks, platforms and devices. With SyncML, data items, but not yet data structure, can be synchronized on different devices connected via one or more interconnecting networks, including, for example, a Universal Mobile Telecommunications System (UMTS) Radio Access Network (UTRAN) and the Internet, where the communication may be wireless in whole or in part or may be wireline. Thus, the devices may communicate via, for example, fixed networks (including wireless networks), infrared, cable, or Bluetooth.

Until now, the progress of mobile data synchronization has mostly been determined by restrictions. Data store synchronization has been based on a set of different, proprietary protocols, each functioning only with a very limited number of devices, systems and data types. These non-interoperable technologies have complicated the tasks of users, manufacturers, service providers, and developers. Further, a proliferation of different, proprietary data store synchronization protocols has placed barriers to the extended use of mobile devices, has restricted data access and delivery and limited the mobility of the users.

As the popularity of mobile computing and communications devices grows, users want access to updated information and applications wherever they are, and using whatever device is available (prompting a need for an open standard such as the SyncML standard). Sometimes, two different devices a user would like to have synchronized (i.e. would like to have the respective data stores on the different devices synchronized) can differ in capability; one device may not be able to handle all the data fields of the records maintained in the first device. In such a situation, the user is usually prompted to set up a mapping or other synchronization arrangement for indicating how fields that occur in the data store of one device but not in the other, i.e. so-called problem fields, are to be handled. This setting up usually happens beforehand, and often involves a tedious mapping of data fields of the first device to the fields of the second device. As onerous as the setting up may be, not doing so can lead to loss of data.

The mapping of problem fields between a first and second data store is described for example in U.S. Pat. No. 5,701,423 to Crozier, in which it is disclosed that a user is to map all the fields in the first data store to respective fields in the second data store before synchronization, irrespective of whether the user uses the fields. Such a setting up process is time-consuming and in some cases a waste of time (when the user ends up never using the problem fields), and leads to problems if changes are made to the configuration of either of the devices.

In a typical synchronizing scenario today, a user will operate two different devices and will engage a synchronizing service, operating a third machine acting as a server in a client/server model, to synchronize the two devices.

What is needed is a way by which user of a first device with problem fields in respect to another, second device (fields not present in the data store on the device but present in the data store on the other device to which the first device is being synchronized), can be alerted to the use of the problem field in the first device, but not alerted until actual use occurs, so that the user is not unnecessarily burdened by having to take care of mapping problems before they actually occur.

DISCLOSURE OF THE INVENTION

Accordingly, in a first aspect of the invention, a method is provided by which a first client data store hosted by a first client device is synchronized with respect to a second client data store hosted by a second client device by synchronizing the two client data stores with respect to a server data store hosted by a server device, the two client data stores each including various data components (e.g. fields of records), the method characterized by: forming structure information indicative of the structure of the two client data stores in respect to at least one data component of the first client data store for which the second client data store does not have either one corresponding data component or does not have two or more data components that in combination correspond to the at least one data component; detecting a use of the at least one data component in the first client data store; and setting a correspondence of the at least one data component in the first client data store in respect to the second client data store.

In accord with the first aspect of the invention, the server may detect the use of the at least one data component of the first client data store, and the server may respond by setting the correspondence, so as to indicate that in subsequent synchronizations information included in the at least one data unit component is either not to be included in the second client data store or is to be included in one or more indicated data components of the second client data store (and so in case of the information being included in two or more data components, the data components are used in combination to hold the information).

Also in accord with the first aspect of the invention, after forming the structure information, the server may maintain the structure information, and further, the server may detect the use of the at least one data component of the first client data store and may do so based on the structure information being maintained.

Also in accord with the first aspect of the invention, the server may detect the use of the at least one data component of the first client data store and then determine for the at least one data component whether the at least one data component has one or more corresponding data components in the second client data store.

Also in accord with the first aspect of the invention, the correspondence may relate the at least one data component of the first client device to either one data component of the second client device not necessarily identical in structure to the at least one data component of the first client device, or to a combination of two or more data components of the second client device.

Also in accord with the first aspect of the invention, the correspondence may be set and indicated to the server by a user of the first client device. Alternatively, the correspondence may be set automatically by the server. Alternatively still, a proposed correspondence may be determined automatically by the server and suggested to the user of the first client device.

Also in accord with the first aspect of the invention, the user of the first client device may be alerted by a message provided to the user indicating that the at least one data component has been used. Further, the user of the first client device may be alerted via a user interface of the first client device or may be alerted via a user interface of the server.

Also in accord with the first aspect of the invention, the server may synchronize the data stores of the two client devices based at least in part on the set correspondence.

Also in accord with the first aspect of the invention, the information indicative of the structure may comprise information about the manufacturer or the model of the second client device or about software used by the second client device in connection with the second data store.

Also in accord with the first aspect of the invention, the information indicative of the structure may comprise data characterizing the data components supported by the second client device.

Also in accord with the first aspect of the invention, the information indicative of the structure may be maintained on the server.

Also in accord with the first aspect of the invention, the information indicative of the structure may be maintained at least in part on the first client device or the second client device.

In a second aspect of the invention, a device is provided comprising means for performing or enabling (in respect to the setting of the correspondence) the steps of the method provided according to the first aspect of the invention. Further, the device may be either a wireless communication terminal or a wireline communication terminal, and may be either a server device or a client device.

In a third aspect of the invention, a system is provided comprising a first client device and a second client device and also a server device, the first client device having a first client data store and the second client device having a second client data store, the first client data store being kept wholly or partly synchronized with the second client data store by synchronizing the two client data stores with respect to a server data store hosted by the server device, the two client data stores each including various data components, the system characterized by the server device having: means for forming structure information indicative of the structure of the two client data stores in respect to at least one data component of the first client data store for which the second client data store does not have either one corresponding data component or does not have two or more data components that in combination correspond to the at least one data component; means for detecting a use of the at least one data component in the first client data store (10c); and means for recording a correspondence of the at least one data component in the first client data store in respect to the second client data store.

In a fourth aspect of the invention, a computer program is provided having instructions for a telecommunications device so that the telecommunications device performs or enables (in respect to the setting of the correspondence) the steps of the method provided according to the first aspect of the invention.

The invention thus provides a method and a corresponding synch field scanner (SFS) whereby problem situations in synchronizing two (or more) devices because of problem fields (fields occurring in the records of a data store in one of the devices but not in the corresponding records in the data store of the other device) can be anticipated beforehand and a user is not burdened with a mapping procedure (to set a correspondence) until a problem field is actually used. The invention simplifies the mapping procedure for attaching multiple devices to a synchronization service (operating a server that hosts software for synchronizing the multiple devices) by automatically suggesting a mapping (correspondence) in some cases, and by not requiring a mapping for a problem field until it is actually used.

The signalling needed by the invention can be provided according to the so-called SyncML standard, an open industry standard for universal synchronization of remote data and personal information across multiple networks, platforms and devices. (See the SyncML.org website.) The current standard allows sending the supported fields (all fields occurring in the data store of the device) in a configuration message, and alerting the user of possible errors or other abnormal status of a synchronization at the end of the synchronization (via a so-called user-action-requested message).

BRIEF DESCRIPTION OF THE DRAWINGS

The above and other objects, features and advantages of the invention will become apparent from a consideration of the subsequent detailed description presented in connection with accompanying drawings, in which.

Figure 2:
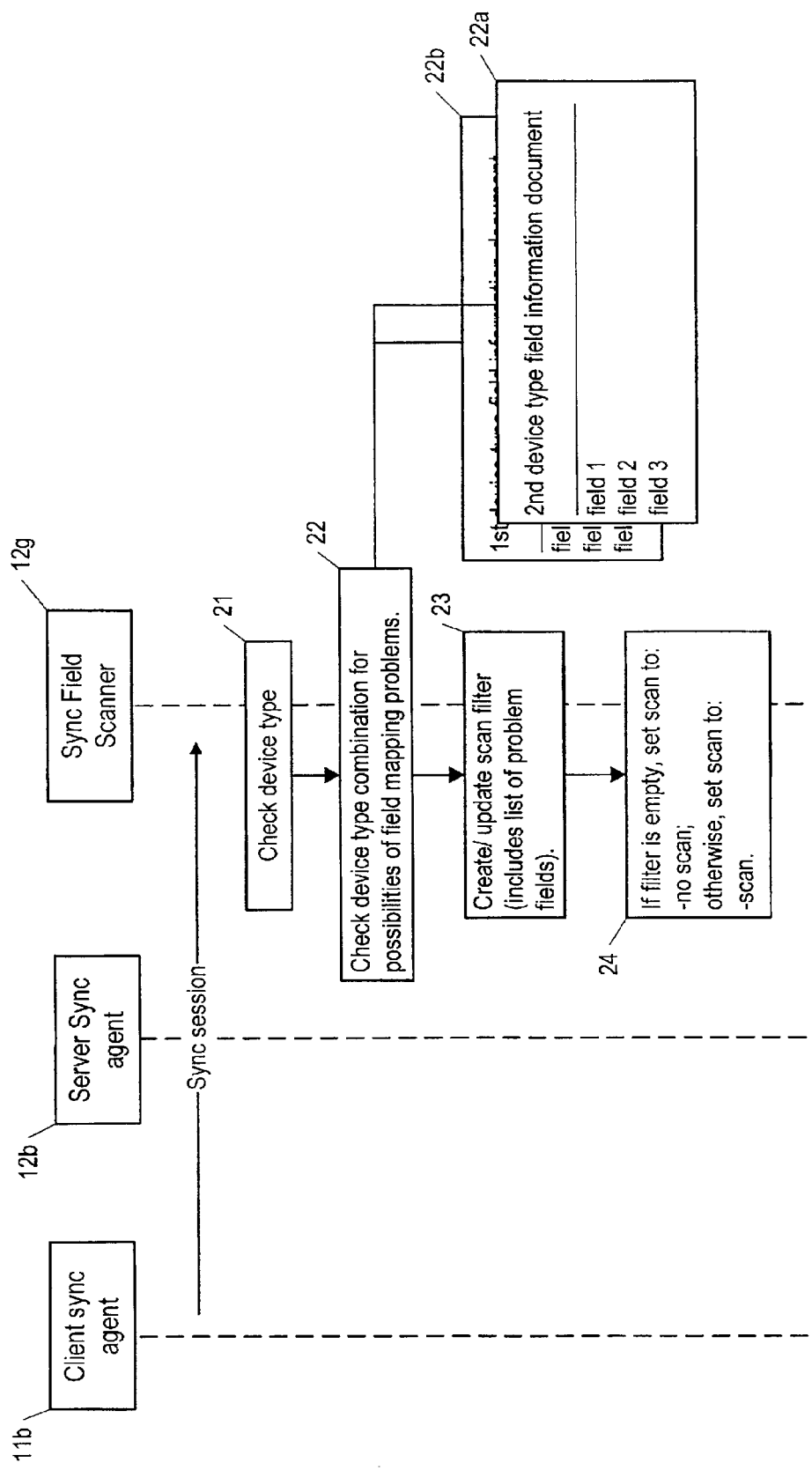
Figure 3:
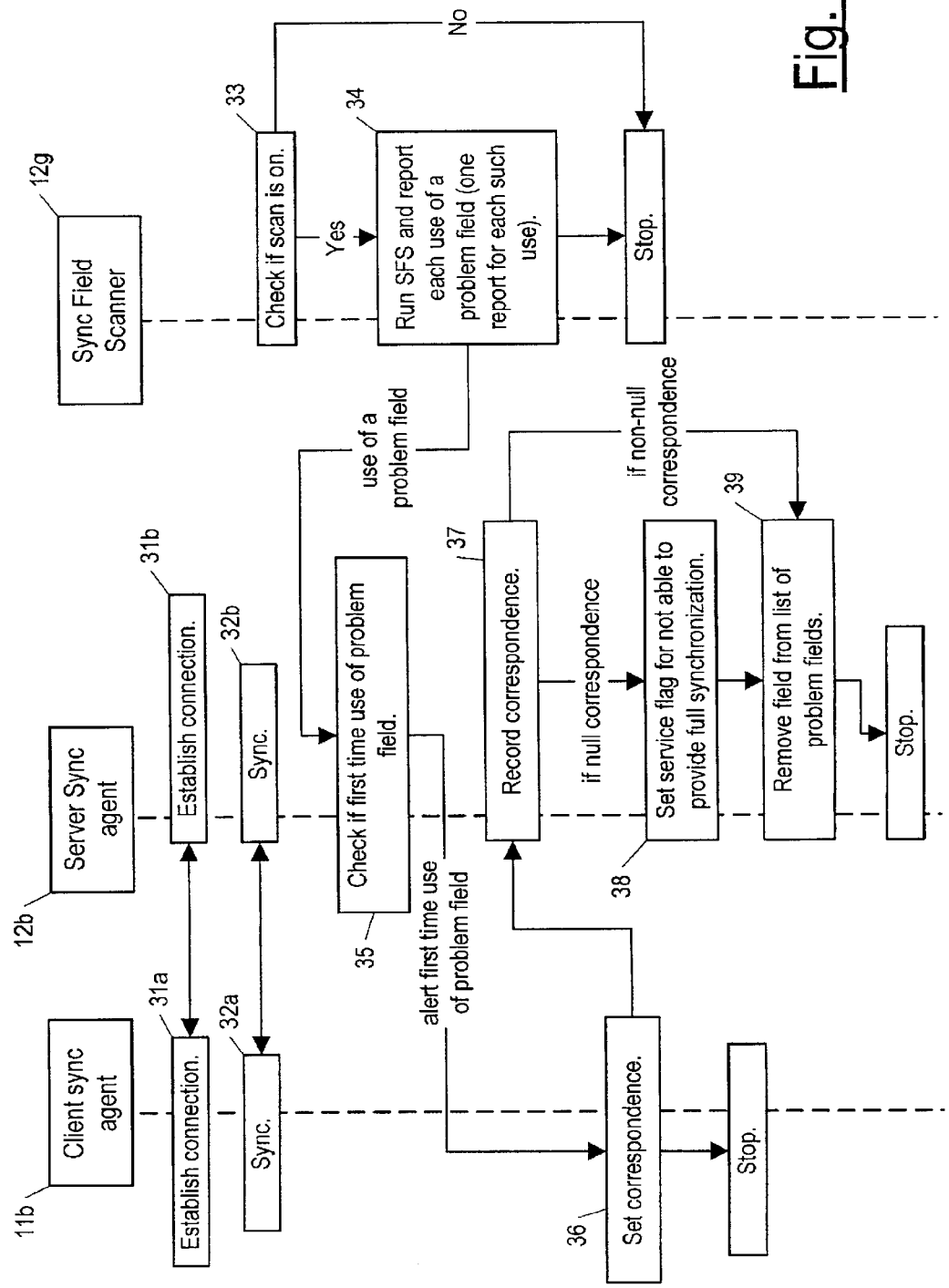

exchanging SyncML messages so as to have the data stores of two client devices synchronized, and showing a sync field scanner operative in association with a server sync agent of the server, the sync field scanner being provided by and operative according to the invention;

FIG. 2 is a flowchart illustrating the setting up of a filter for use by the sync field scanner in determining when there is a first use of a field in one client data store that is not present in the other client data store (i.e. a problem field); and FIG. 3 is a flowchart illustrating actions taken by the sync field scanner and the sync agent of the server upon discovery of the use of a problem field.

BEST MODE FOR CARRYING OUT THE INVENTION

The invention will now be described in the context in which SyncML is used to synchronize the respective data stores of two or more devices acting as clients in a client/server model and a device acting as the server, and operated as a synchronizing service. Besides using SyncML, it should be understood, that the invention applies equally to synchronization according to any other protocol or format, current or future one, such as IrMC level 4, HotSync, IntelliSync, PCSync, MAL, or the like. It should also be understood that although the invention is here described for having a server device, operating a service, synchronize two client devices, the invention also encompasses situations in which only two devices are involved at a time, one acting as a server and the other as a client.

The essence of the invention is that a scanner module, called here the sync field scanner (SFS), is hosted by the server device so as to interface with a sync agent and sync engine of the server device, and keeps a record of (potential) problem fields, the phraseology problem field being used here to indicate any field of a record, or in general any data component of some data organization, that occurs in the data store of one of the client devices but not in the other. The SFS alerts the user of the two devices when a problem field is first used, thus allowing the user to delay addressing a problem field until it is actually used.

Background on SyncML

SyncML uses the syntax of the so-called Extensible Markup Language (XML) as set out in Extensible Markup Language (XML) 1.0, a product of the World Wide Web Consortium (W3C) XML Activity, having a website at: http://www.w3.org. For information about XML, see: http://www.w3.org/XML.

A SyncML message is a nested structure, and one or more SyncML messages can be associated with what is called a SyncML package. The SyncML Message is an individual XML document consisting of one or more elements each of one or more element types. The document consists of a header, specified by the SyncHdr element type, and a body, specified by the SyncBody element type. The SyncML header specifies routing and versioning information about the SyncML Message. The SyncML body is a container for one or more SyncML Commands. The SyncML Commands are specified by individual element types. The SyncML Commands act as containers for other element types that describe the specifics of the SyncML command, including any data or meta-information.

SyncML defines request commands and response commands. Request commands include, for example: add (a command that allows the originator to ask that one or more data units be added to data accessible to the recipient); alert (allowing the originator to notify the recipient of a condition; copy (allowing the originator to ask that one or more data units accessible to the recipient be copied); delete (allowing the originator to ask that one or more data units accessible to the recipient be deleted or archived); get (allowing the originator to ask for one or more data units from the recipient); and search (allowing the originator to ask that the supplied query be executed against one or more data units accessible to the recipient). The only response commands are currently: status (indicating the completion status of an operation or that an error occurred while processing a previous request); and results (used to return the data results of either a Get or Search SyncML Command).

As already mentioned, the SyncML representation protocol (i.e. a SyncML message) is a document mark-up consisting of XML element types. The element types are defined in terms of their purpose or usage, parent elements, any restrictions on content or use and content model. The element types include so-called common use elements, message container elements, data description elements, protocol management elements, and protocol command elements.

Common use element types are element types used by other SyncML element types, and include, for example, archive, for indicating that the data specified in a delete command should be archived by the recipient of the delete command, rather than simply deleted. Thus the delete command can use the archive common use element and so is referred to as the parent element of the archive common use element type, in this context. Another common use element type is the Cmd element type, which is used to specify the SyncML command referenced by a Status element type (and so the Status element type is the parent element in this context). Another is the CmdID element type, which is used to specify a SyncML message-unique command identifier, and can have various parent elements, including: Add, Alert, Atomic, Copy, Delete, Exec, Get, Map, Put, Replace, Results, Search, Sequence, Status, and Sync.

Message container element types provide basic container support for SyncML messages. Three such element types are: SyncML, for specifying the container for a SyncML message, and having no parents since it is what is called a root or document element; SyncHdr, for specifying the container for the revisioning information or the routing information (or both) in the SyncML message, and having as a parent element a SyncML element; and SyncBody, for specifying the container for the body or contents of a SyncML message, and also having as a parent element a SyncML element.

Data description elements are used as container elements for data exchanged in a SyncML Message; data description elements include the following element types: Data, for specifying discrete SyncML data, and used by (parent elements) Alert, Cred, Item, Status, and Search element types; Item, for specifying a container for item data, and used by (parent elements) Add, Alert, Copy, Delete, Exec, Get, Put, Replace, Results, and Status; and Meta, for specifying meta-information about the parent element type, and used by (parent elements) Add, Atomic, Chal, Copy, Cred, Delete, Get, Item, Map, Put, Replace, Results, Search, Sequence, and Sync.

The protocol management elements include, at present, only the element type Status, for specifying the request status code for an indicated SyncML command, and used by (parent element) SyncBody.

Finally, there are the Protocol Command Elements. These include the command elements already mentioned, i.e. for example: Add, for specifying that data be added to a data collection, used by (parent elements) Atomic, Sequence, Sync, SyncBody; Delete; Replace; and so on.

All of the above element types are set out in the standard, SyncML Representation Protocol, available on the Internet at:

http://www.syncml.org/docs/syncml_represent_v11_20020215.pdf.

Besides being used to synchronize data stores, SyncML (i.e. the language) can be used for device management, and more particularly for transferring management actions between a client and a management server for the client. See http://www.syncml.org/ to find the specification, SyncML Device Management Protocol. SyncML Device Management Protocol allows management commands to be executed on management objects and it uses a package format similar to the SyncML Synchronization Protocol and the SyncML Representation Protocol. A management object might reflect a set of configuration parameters for a device. Actions that can be taken against this object might include reading and setting parameter keys and values. Another management object might be the run-time environment for software applications on a device. Actions that can be taken against this type of object might include installing, upgrading, or uninstalling software elements. Actions are represented by SyncML Device Management Protocol Commands, which are described in SyncML Representation Protocol, Device Management Usage. The commands and message structure used correspond identically to that of the SyncML Synchronization Protocol. (Thus, the so-called document type definition for the Management Protocol is the document type definition from SyncML Synchronization Protocol.)

The Sync Field Scanner of the Invention

Figure 1:
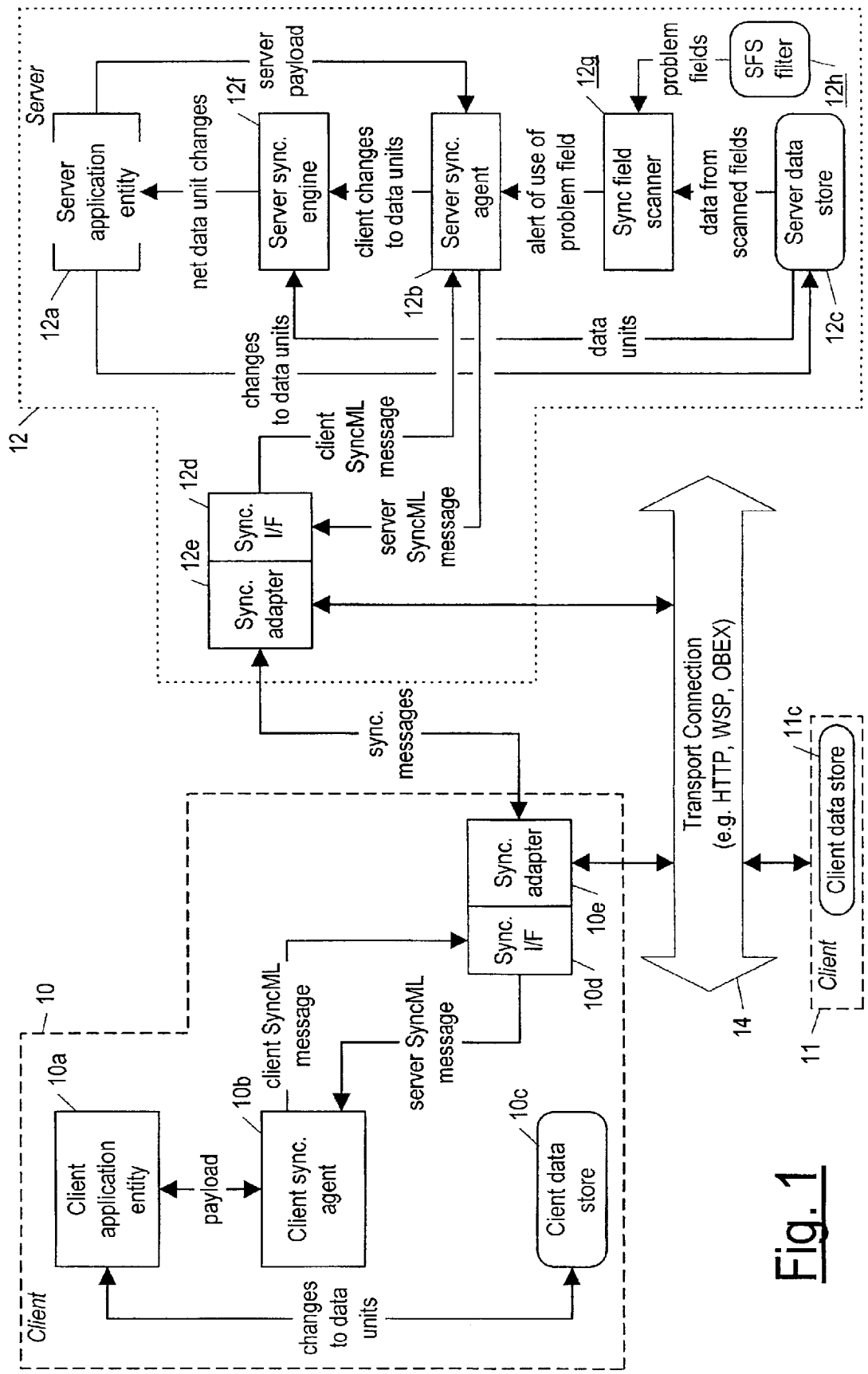
FIG. 1 is a block diagram/flow diagram of two clients (such as a mobile phone and a laptop computer) and a server (operated for example by a synchronization service)

Referring now to FIG. 1, a first client device 10 is shown synchronizing a client data store 10c with a corresponding data store 11c of a second client device 11, with both data stores also being synchronized to a corresponding data store 12c in a server device 12.

In the arrangement illustrated in FIG. 1, the server device 12 is operated as a synchronizing service, and is typically not used to enter data directly into the data store 12c it maintains in order to synchronize the respective data stores of the two client devices 10 11. However, as noted above, the invention also comprehends situations in which one or another of the client devices 10 11 is instead used as a server device (in a client/server model) and is the user in such a situation does enter data directly into the data store of the server device.

The data stores of the two client devices 10 11 can be of use in either device management or for holding user data, such as for example e-mails, address book entries, calendar events, or in general, any form of digital content. A data store can in general include one (or even more) system directory structures and possibly also one or more internal directory structures (i.e. an internal directory structure being one maintained by one or more applications as opposed to an operating system), with any directory structure able to be represented as a tree structure of folders, each folder able to include one or more data units (such as files, i.e. units of data maintained in a system directory structure, or units or data maintained by applications in an internal directory, such as e-mails maintained by an e-mail application) and one or more other folders of the tree structure. In the preferred embodiment, as mentioned above, the synchronizing occurs via the exchange of SyncML messages.

As already explained, the client devices 10 11 play the role of a client in a client/server model, and according to SyncML protocol, to initiate synchronization, a client (usually a laptop or a portable phone or other wireless terminal) first sends all changes in its data store 10c to the server device 12, usually a remote synchronization server connected to the Internet.

In FIG. 1, the second client device 11 includes all of the same components as shown for the first device (such as a sync agent and an application), but for clarity of illustration of all the components of the second device 11, only the client data store 11c corresponding to the client data store 10c of the first client device 10 is shown. The clients 10 11 and the server 12 can all include one or more application entities 10a 12a, and they also each include a (generic, i.e. not particularized to a particular application) sync agent 10b 12b. The server also includes a sync engine 12f. It should be noted that the server need not include any application entities, and in the arrangement being described, the server would most likely not include application entities. However, if the server does include an application entity 12a, the application entity 12a differs from the client application entity 10a in that it not only interfaces with the server sync agent, but also interfaces with the server sync engine 12f, which has no counterpart in the client 10. Similarly, the server sync agent 12c differs from the client sync agent 10c in that it also interfaces with the server sync engine 12f.

As indicated above, a client application entity 10a can be for example a calendar application used to keep track of appointments for a salesperson. If an appointment is made on the first client device 10, then the appointment information is stored in the first client data store 10c as a new file. Later, either at the request of the client 10 or the prompting of the server 12, the server data store 12c is synchronized with the first client data store 10c in respect to the new data (i.e. the new file) by the exchange of SyncML messages. The same holds true in respect to the second client device 11 and the server device 12. In this way, the first and second client devices 10 11 are eventually fully or partially synchronized, depending on the time interval that elapses between when the first device 10 synchronizing with respect to the server device 12 and when the second device 11 synchronizes with the server device.

Still referring to FIG. 1, the SyncML messages used in synchronizing may be communicated according to various transport connections 14, including for example hypertext transport protocol (HTTP), wireless session protocol (WSP), and object exchange protocol OBEX). (The transport connections may be provided using any kind of physical layer connection, including either a wireless connection or a wireline connection.) As shown, when the server device 12 communicates a SyncML message to the first client device 10 (and vice versa), the server sync agent 12b uses a sync interface (I/F) 12d to provide the message to a server sync adapter 12e which in turn provide the SyncML message to the first client device 10 via the transport connection 14. At the receiving end, a client sync adapter 10e receives the SyncML message and passes it to a client sync I/F 10d which in turn provides it to the client sync agent 10b.

Now, according to the invention and still referring to FIG. 1, a sync field scanner (SFS) 12g is included in the server device 12 and is operative in association with the server sync agent 12b, i.e. the SFS interfaces with the server sync agent 12b. Assuming that the first client device 10 has already synchronized with the server device 12, when the second client device 11 first synchronizes with the server 12, the SFS 12g of the server compiles a list of problem fields that it will monitor based on the device type of the first client device and that of the second client device, both device types being indicated during each respective first synchronization.

In what follows, it is usually assumed that it is the first client device 10 that includes in its data store 10c a problem field, although of course, in general, both client devices could contain (different) problem fields (or a field could occur in both but in a different format, in which case it can be considered a problem field in either one or the other device), and, of course, by even simple pairwise extension of what is described below, the invention applies to cases in which more than two client devices are kept synchronized (wholly or partially).

To compile the list or problem fields, which, in the preferred embodiment, is stored as part of what is here called an SFS filter 12h (but could also be developed as needed and can, in some embodiments, be developed as needed on a field-by-field basis instead of for all fields in the respective data stores of two client devices being synchronized, so that a list per se never actually exists), in the preferred embodiment the SFS uses information made available by the manufacturer of the client devices, information that indicates what fields are used by corresponding applications on the different client devices. (The server device 12 of course includes all fields used by any client device in its data store 12c.) Alternatively, the SFS can use the field information (in addition to the device type information) the devices send in the synchronization messages, assuming that each client device indicates in each synchronization all fields used by the client device (so that the field information is always available in case further client devices are later added to the set of client devices being synchronized).

When the SFS observes a first use of a problem field, it alerts the server sync agent, which, in the preferred embodiment, in turn signals the client device using the field, as described below. (Other responses to the alert are also possible, as described below.)

Like the sync agents 10b 12b, the SFS is generic, i.e. for a given client device, the SFS (hosted by the server device) is for use for monitoring data stores for all applications of the client device, and it is also of use for any client device. On the other hand, the SFS filter created by the SFS is of course particularized; there is a different SFS filter for each different data store and for each combination of client devices.

Referring now to FIG. 2 and also to FIG. 1, in the preferred embodiment, the SFS 12g creates the SFS filter 12h after both of the two clients 10 11 each engage in a first sync session with the server 12. In the first session for each client device, the server detects the client device type, and uses the type information in creating the SFS filter for the client device pair. FIG. 2 is provided assuming that the second client device 11 has already undergone a first synchronization with the server device 12, and the first client device has yet to undergo its first synchronization. FIG. 2 shows the first client device synch agent 10b undergoing its first synchronization and then, afterward, the SFS filter 12h being created for the pair of client devices 10 11 by the SFS 12g of the server 12. To create the SFS filter 12h, in a step 21, the SFS 12g checks the device type of the first client device 10 (based on information provided during the synchronization). In a next step 22, the SFS checks standard format documentation 22a 22b for each client device 10 11 to determine whether for the pair of devices 10 11 there are any problem fields. In the preferred embodiment, the standard format documentation 22a 22b is provided by the SyncML initiative (a group of company entities that work together to make SyncML available for use in synchronizing data stores). In the preferred embodiment, the SyncML initiative manages field mapping documentation formats for different client devices (setting out the format in which the field mapping information is provided) and publishes the different vendor documentation describing which fields are used by which applications when hosted by different device types. Then, in a next step 23, the SFS creates the SFS filter 12h for the pair of client devices 10 11 (or updates the SFS filter 12h after subsequent synchronizations). The SFS filter so created may contain fields or may be empty. In a next step 24, if the SFS filter is empty, an attribute associated the SFS filter 12h, called the scan attribute, is set to -no scan, and otherwise it is set to -scan.

The SFS filter 12h created in step 23 can be considered to contain, or point to, structure information indicative of the structure of the two client data stores 10c 11c in respect to at least one data component/problem field of the first client data store 10c. The structure information can be as specific as a list of problem fields, or can be information from which a list of problem fields can be derived, such as the respective device types (as indicated by for example either the respective manufacturers or respective model identifiers) of the first and second client devices 10 11, or the software and version number of the application 10a on the first client device 10 and the corresponding application (not shown) on the second client device 11. In case of the SFS filter 12h including only for example a model number (from which a device type can be inferred) of each of the two client devices 10 11, the SFS 12g would refer to one or more secondary files/data stores (made available preferably through the SyncML Initiative) indicating what fields are used by which applications for which models (of a device). The secondary file or files can be for example hosted by the client devices 10 11, or hosted by the server 12, or hosted by another entity accessible to either the server 12 or one or the other of the client devices 10 11. In such embodiments, the SFS filter 12h can thus be distributed across different files, perhaps on different equipment. As another possibility, the SFS filter even as a simple list of problem fields, can be hosted by one or both of the client devices; if the first client device has a problem field, and also the second client device, then part of the SFS filter for the two client devices (in respect to the data stores 10c 11c being synchronized) would be hosted by the first client device 10 (the part including the problem field occurring in the first data store 10c but not in the second) and part would be hosted by the second client device 11 (the part including the problem field occurring in the second data store 11c but not in the first data store 10c).

Referring now to FIG. 3 and still also to FIG. 1, a scenario in which the first client device synch agent 10b is shown synchronizing with the server device synch agent 12b after the SFS filter 12h has been created for the pair of client devices 10 11, as illustrated for example in FIG. 2. In the scenario illustrated in FIG. 3, after the first client device 10 and the server device 12 each perform respective steps 31a 31b required to establish a connection between the two of them, and each then performs respective steps 32a 32b required to synchronize their respective data stores 10c 12c. After the synchronization, in a next step 33, the SFS 12g checks to determine whether the scan attribute for the pair of client devices 10 11 is set to -scan. If so, in a next step 34, the SFS analyzes the changes in the data store 10c of the first client device 10 as reflected by the server data store 12c (since the server data store 12c and the first client data store 10c are synchronized at the point in time when the SFS performs its analysis). If the SFS detects that a problem field has been used, it alerts the server sync agent 12b. Then, in a next step 35, the server sync agent checks whether the use of the problem field is the first use for the first client device (identified typically by an IMEI, i.e. an international mobile equipment identifier), and if the use is for the first time, the server sync agent alerts the user operating the first client device 10 that a problem field is being used (for the first time) and a mapping (correspondence) is required. In a next step 36, the user of the client device 10 sets a correspondence/mapping for the problem field (so that it is then no longer a problem field), a correspondence that could be a null correspondence, i.e. one in which the problem field in the first data store 10c is simply not mapped to any field or fields of the second data store 11c, a direct correspondence (to a specific field in the data store 11c), or a one-to-many correspondence (i.e. so that the information in the problem field of the first data store 10c is mapped to two or more fields in the second data store 11c). Then, in a next step 37, the server sync agent 12b records the correspondence set by the user (e.g. in a separate table in or associated with the data store 12c on the server 12, showing how to map fields for which a correspondence has been set). If the correspondence set by the user is a null correspondence, then in a next step 38, the server 12 sets a service flag (again e.g. in a separate table in or associated with the data store 12c on the server 12) for indicating that full synchronization is not performed for the two client data stores 10c 11c. In either case, in a next step 39, the server (12) removes the field from the list of problem fields.

Instead of the user of the client device 10 setting (manually) a correspondence for a problem field in the first data store 10c so as to have it mapped to none, one or a combination of fields in the second data store 11c, a correspondence can be determined automatically by either the server sync agent 12b or the SFS 12g, and either implemented with or without the approval of the user of the first client device 10. In addition, if a null correspondence is set for a problem field, the user can be reminded at each use of the problem field after the first use, and can be given the opportunity to provide a mapping after the first use, and can also be given the opportunity to decline being warned with each subsequent use. If a user sets a non-null correspondence after the first use, and if no other problem fields have been used for which only a null correspondence is in force, then the service flag used for indicating only partial synchronization would be updated to reflect that full synchronization is performed.

It should be understood that although in the scenario illustrated in FIG. 3 certain functions are performed by certain entities, e.g. the server sync agent 12b records the correspondence set by the user, embodiments in which the same or alternative functions are performed by different entities are also possible and contemplated by the invention. For example, the SFS 12g could notify the user of the first time use of a problem field in the first client data store 10c and interact with the user so as to ultimately have a correspondence for the problem field recorded on the server 12. In the preferred embodiment, if the user does not want to provide a mapping for a problem field, the user is able to indicate whether the server sync agent should alert the user the next time the problem field is used. If a use is not the first use and the user has elected the option of not being reminded that the problem field is being used again without a mapping, then the server sync agent simply updates the service flag indicating that the data stores of the different client devices 10 11 can only be partially synchronized.

Discussion

Preferably, the SFS 12g includes a main part and a separate SFS administration tool, and the SFS administration tool inputs the field data for each different application and for each different device being synchronized into an SFS device field configuration pool (not shown, but would also reside in the server 12 so as to be accessible to the SFS 12g). The SFS 12g then generates the SFS filter 12h from the device field configuration pool. When a problem field is first used on a client device 10 or 11 and becomes known to the server device 12, the server device 12 makes decisions on how to respond based on application specific logic, including, in the usual case of there being more than one client, providing information to the different clients 10 11.

Preferably, the SFS filter for a pair of client devices 10 11 should not be user case specific, i.e. the field scan ought to be able to be generated on the fly from the device type information for the pair or client devices being synchronized.

Preferably, the terminal field information would be standardized by the SyncML initiative (or corresponding organization in case of a technology different from SyncML), i.e. the SyncML initiative would keep available a universal field standard list. (Access to the list could be free of charge, or restricted to SyncML sponsors, or, in case of proprietary synchronization protocol, licensed.) In such an arrangement, when a new terminal comes to the market, any synchronization service provider/operator could compare the new terminal to the universal field standard. If any fields not already included in the universal field standard are found, they would be reported to the SyncML initiative. If no such fields are found, then the preexisting universal field standard could be used to provide field mapping to any other terminal compatible with the field mapping standard. Therefore, if the SFS of the invention were to incorporate the field mapping standard information in its configuration, the SFS would need only be told, in a standardized way, the field configuration of a new-to-the-market terminal.

Preferably also, the SFS can be disabled in order to maximize performance in some situations, such as when there is only one client device; there is only one client device and also a server with all fields, so that the user cannot have field mapping problems since the server would then include all the fields the client includes, and only those fields; there are multiple client devices but all of the same type; and there are multiple different type of devices (and also a server), but fields used by all of the devices are the same. For some client device types, however, such as the Nokia 9210 which has user-definable fields, the scan setting should be enabled at all times if there is more than one client device being synchronized (from time to time) via a server.

Preferably also, server logic controls the SFS by initiating the scanning process based on defined scan settings.

The SFS of the invention can be implemented to reside on equipment other than server equipment. It can even be remote from the server. But for performance, it is preferable that the SFS reside on the server equipment.

Instead of running essentially immediately following a synchronization session, as described above, the SFS can be engaged as a scheduled task, scheduled to run at a low-load time.

Using an SFS according to the invention offers the possibility of standardizing, as part of the SyncML initiative, the format used for field-mapping documentation, enabling greater multi-vendor interoperability. Thus, different vendors could, according to the invention, have a common way of announcing the fields supported by their devices. In this way, the operation of the SFS could be made more automatic.

As described above, the SFS adds any problem fields it discovers to a list of to-be-followed problem fields. When the SFS alerts the user of a device that it has detected the first-time use of a problem field, the action taken by the user can be a single-field mapping, or the system can automatically try to resolve the problem (or propose most likely mapping alternatives to the user), such as by creating multiple contact cards in case of contact cards in one device including some fields not included in the contact cards of the other device, the fields of the multiple contact cards of the client device not having all the fields of the other (assuming only one client device is missing some fields in the other) would then be used in combination to hold all the field values of the other client device.

In some embodiments, what might be called profiles can be used for providing logic by which the SFS is operative. For example, if a headset always only has name and phone number fields defined for a contact card, and the fax field is for the first time used for another device to which the headset is to be synchronized (via a server), then a profile can be used to indicate that no action is to be taken to find out what to do with the fax data field contents of the other device.

In addition to problems because one device includes a field not (normally) used by the other device, the invention encompassed taking into account situations where fields on two different devices are used to hold the same information but are not compatible because of being different size or type (i.e. for example one is integer and one is a floating point number), or their maximum size is different. For example, if a large image is inserted into a field of one device, and the image size is larger than what a second device can handle, according to the invention some action is taken in each situation to resolve the problem. For example, in the case of a smaller allowed image size on a second device, the image can be scaled down when it is synchronized to the second device.

It should also be noted that future devices may enable users to create new data fields on the fly, making any existing mapping obsolete. The invention can encompass such a development by having the SFS continually examine the fields being synchronized by the different devices, and updating the SFS filter for each pair of client devices in case of each new field definition that either results in a problem field or eliminates a problem field (because for example a field of one device of a pair has been redefined to be compatible with a corresponding field of the other device of the pair).

Besides the embodiments indicated above, the invention also comprehends embodiments in which the SFS filter 12h is formed, as needed, but not maintained. In such embodiments, during a synchronization in which the first client device 10 is assumed (as above) to have a problem field (a field that occurs in the data store 10c of the first client device 10 but either does not occur in the data store 11c of the second client device 11 or occurs there in a different format), as the server 12 encounters each field in turn, it determines whether the field is a problem field based either on information (such as the device type and manufacturer and model of the second client device) accessible to the server and indicating whether the (same exact) field is present in the second client device 11 (and for which a mapping has not already been provided if the field was formerly a problem field), or, if the second client device 11 is, at the time, connected to the server 12, by interrogating the second client device as to the occurrence of the field in the data store 11c of the second client device. In other, similar embodiments, the server 12 forms (builds) an entire SFS filter for the data stores 10c 11c of the two client devices 10 11 at the time of synchronizing the first client device, but does not maintain the SFS filter 12h between synchronizations. In such other, similar embodiments, the server 12 may again access information (possibly over the Internet) regarding the fields present in the second client device 11, or, if the second client device is attached to the server at the time the first client device 10 is being synchronized, the server may interrogate the second client device to determine what fields are present in the data store 11c of the second client device.

When a problem field is first used on the first client device 10, in general the user of the first client device 10 is remote from the server 12 and is alerted to the use of the field (and either informed of a mapping/correspondence having been automatically set by the server, offered a mapping/correspondence, or asked to provide one) via a display as part of a user interface system on the first client device 10. It is also possible, however, for the user to be interfacing with either the server 12 during the synchronization or with both the server 12 and the first client device 10, in which case the user can be alerted via either the user interface of the first client device (if it is operative, i.e. if it is not in a sleep mode or otherwise frozen by the server because of being plugged into a saddle connected to the server) or the user interface of the server.

Scope of the Invention

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method by which a first client data store (10c) hosted by a first client device (10) is synchronized with respect to a second client data store (11c) hosted by a second client device (11) by synchronizing the two client data stores (10c 11c) with respect to a server data store (12c) hosted by a server device (12), the server having an established connection with the client devices, the two client data stores (10c 11c) each including various data fields, the method characterized by:

forming (23 39) structure information indicative of the structure of the two client data stores (10c 11c) in respect to at least one data field of the first client data store (10c), for which the second client data store (11c) does not have either one corresponding data field or does not have two or more data fields that in combination correspond to the at least one data field;

detecting (34) by the server (12) or the first client device (10) a use of the at least one data field in the first client data store (10c); and setting (36) a correspondence of the at least one data field in the first client data store (10c) in respect to the second client data store (11c), in order for the at least one data field in the first client data store to be used by the second client.

2. The method of claim 1, wherein the server (12) detects (34) the use of the at least one data field of the first client data store (10c), and the server (12) responds by setting the correspondence, so as to indicate that in subsequent synchronizations information included in the at least one data field is either not to be included in the second client data store (11c) or is to be included in one or more indicated data fields of the second client data store (11c).

3. The method of claim 2, wherein after forming (23 39) the structure information, the server (12) maintains (23 39) the structure information, and further wherein the server (12) detects (34) the use of the at least one data field of the first client data store (10c) and does so based on the structure information being maintained.

4. The method of claim 2, wherein the server (12) detects (34) the use of the at least one data field of the first client data store (10c) and then determines for the at least one data field whether the at least one data field has one or more corresponding data fields in the second client data store (11c).

5. The method of claim 2, further characterized in that the correspondence relates the at least one data field of the first client device (10) to either one data field of the second client device (11) not necessarily identical in structure to the at least one data field of the first client device (10), or to a combination of two or more data fields of the second client device (11).

6. The method of claim 2, wherein the correspondence is set and indicated to the server (12) by a user of the first client device (10).

7. The method of claim 2, wherein the correspondence is set automatically by the server (12).

8. The method of claim 2, wherein a proposed correspondence is determined automatically by the server (12) and suggested to the user of the first client device (10).

9. The method of claim 2, wherein the user of the first client device (10) is alerted by a message provided to the user indicating that the at least one data field has been used.

10. The method of claim 9, wherein the user of the first client device (10) is alerted via a user interface of the first client device (10).

11. The method of claim 9, wherein the user of the first client device (10) is alerted via a user interface of the server (12).

12. The method of claim 1, further characterized by the server (12) synchronizing the data stores (11c) of the two client devices (10 11) based at least in part on the set correspondence.

13. The method of claim 1, further characterized in that the information indicative of the structure comprises information about the manufacturer or the model of the second client device (11) or about software used by the second client device (11) in connection with the second data store (11c).

14. The method of claim 1, further characterized in that the information indicative of the structure comprises data characterizing the data fields supported by the second client device (11).

15. The method of claim 1, further characterized in that the information indicative of the structure is maintained on the server (12).

16. The method of claim 1, further characterized in that the information indicative of the structure is maintained at least in part on the first client device (10) or the second client device (11).

17. A device for use in carrying out a method by which a first client data store (10c) hosted by a first client device (10) is synchronized with respect to a second client data store (11c) hosted by a second client device (11) by synchronizing the two client data stores (10c 11c) with respect to a server data store (12c) hosted by a server device (12), the server having an established connection with the client devices, the two client data stores (10c 11c) each including various data fields, the device comprising at least two of the following:

means for forming (23 39) structure information indicative of the structure of the two client data stores (10c 11c) in respect to at least one data field of the first client data store (10c), for which the second client data store (11c) does not have either one corresponding data field or does not two or more data fields that in combination correspond to the at least one data field;

means for detecting (34) by the server (12) or the first client device (10) a use of the at least one data field in the first client data store (10c); and means for setting (36) a correspondence of the at least one data field in the first client data store (10c) in respect to the second client data store (11c), in order for the at least one data field in the first client data store to be used by the second client.

18. A device as in claim 17, wherein the device (10 11 12) is either a wireless communication terminal or a wireline communication terminal.

19. A device as in claim 17, wherein the device (10 11 12) is a server device (12).

20. A device as in claim 17, wherein the device (10 11 12) is a client device (10 11).

21. A system, comprising a first client device (10) and a second client device (11) and also a server device (12), the first client device having a first client data store (10c) and the second client device having a second client data store (11c), the first client data store (10c) being kept wholly or partly synchronized with the second client data store (11c) by synchronizing the two client data stores (10c 11c) with respect to a server data store (12c) hosted by the server device (12), the two client data stores (10c 11c) each including various data fields and having an established connection with the server device, the system characterized by the server device (12) having:

means for forming (23 39) structure information indicative of the structure of the two client data stores (10c 11c) in respect to at least one data field of the first client data store (10c) for which the second client data store (11c) does not have either one corresponding data field or does not two or more data fields that in combination correspond to the at least one data field;

means for detecting (34) by the server (12) or the first client device (10) a use of the at least one data field in the first client data store (10c); and means for recording (37) a correspondence of the at least one data field in the first client data store (10c) in respect to the second client data store (11c), in order for the at least one data field in the first client data store to be used by the second client.

22. A computer readable medium encoded with a software data structure for providing instructions to a telecommunications device (10 11 12) so that the telecommunications device (10 11 12) performs or enables at least part of a method by which a first client data store (10c) hosted by a first client device (10) is synchronized with respect to a second client data store (11c) hosted by a second client device (11) by synchronizing the two client data stores (10c 11c) with respect to a server data store (12c) hosted by a server device (12), the server having an established connection with the client devices, the two client data stores (10c 11c) each including various data fields, the method characterized by:

forming (23 39) structure information indicative of the structure of the two client data stores (10c 11c) in respect to at least one data field of the first client data store (10c), for which the second client data store (11c) does not have either one corresponding data field or does not have two or more data fields that in combination correspond to the at least one data field;

detecting (34) by the server (12) or the first client device (10) a use of the at least one data field in the first client data store (10c); and setting (36) a correspondence of the at least one data field in the first client data store (10c) in respect to the second client data store (11c), in order for the at least one data field in the first client data store to be used by the second client.

23. A device (12) comprising means for performing the steps recited in claim 1 for forming (23 39) structure information and detecting (34) a use of the at least one data field.

24. A device (10 11) comprising means for performing the step recited in claim 1 for setting (36) a correspondence.

25. The method of claim 1, wherein the step of setting the correspondence is in response to detecting the use of the at least one data field that is indicated by the structure information.

26. The method of claim 1, wherein a user is alerted that the at least one data field is a problem field only when the user provides a value for the at least one data field.

* * * * *